United States Patent [19]
Schafer

[11] Patent Number: 5,819,422
[45] Date of Patent: Oct. 13, 1998

[54] TRANSPARENT MEASURING DEVICE AND METHOD OF MAKING

[76] Inventor: Randal D. Schafer, 3838 Cape Horn Rd., Concrete, Wash. 98237

[21] Appl. No.: 737,533
[22] PCT Filed: Apr. 25, 1996
[86] PCT No.: PCT/US96/05759
 § 371 Date: Nov. 12, 1996
 § 102(e) Date: Nov. 12, 1996
[87] PCT Pub. No.: WO97/09179
 PCT Pub. Date: Mar. 13, 1997

Related U.S. Application Data

[60] Provisional application No. 60/002,733, Sep. 5, 1995.
[51] Int. Cl.⁶ ........................................................ B43L 7/00
[52] U.S. Cl. .................................. 33/1 B; 33/11; 33/494; 33/476
[58] Field of Search ............................... 33/1 B, 11, 494, 33/476, 562, 565

[56] References Cited

U.S. PATENT DOCUMENTS

| 2,171,504 | 8/1939 | Keuffel et al. | 33/476 |
| 2,459,694 | 1/1949 | Gordon | 33/494 |
| 2,463,868 | 3/1949 | Gutridge | 33/494 |
| 4,779,346 | 10/1988 | Schafer | 33/1 B |
| 4,942,670 | 7/1990 | Brandt | 33/494 |

FOREIGN PATENT DOCUMENTS 753009 10/1933 France ..................................... 33/494

Primary Examiner—Thomas B. Will
Attorney, Agent, or Firm—Seed and Berry LLP

[57] ABSTRACT

An improved transparent measuring device having composite multicolor image (98) formed thereon using a unique pigment transfer process. The image is formed by first applying a first image 30 having pairs of lines (34,36) that form an uncolored gap (38) on the transparent sheet (76). A second image (52) having solid lines (57,58) is aligned with the first image (30) and applied to the transparent sheet (76) with a contrasting color such that the second image (52) fills in selected gaps 38. An optional third image (68) can be applied over the first and second images (30,52).

32 Claims, 8 Drawing Sheets 5,819,422

TRANSPARENT MEASURING DEVICE AND METHOD OF MAKING

This application claims the benefit of prior U.S. provisional application, Ser. No. 60/002,773 filed on Sep. 5, 1995.

TECHNICAL FIELD

The present invention pertains to rulers and cutting guides, and, more particularly, to an improved transparent measuring device having multicolor graduations formed thereon and methods of making the same.

BACKGROUND OF THE INVENTION

The present invention is related to applicant's Transparent Measuring Device with Multicolored Lines that is the subject of U.S. Pat. No. 4,779,346, which is incorporate herein by reference. As described therein, the measuring device uses a novel formation of composite lines to enhance the visibility of the lines against a multicolor background. More particularly, each composite line is formed from two adjacent lines of contrasting colors or hues.

One embodiment of the previous invention has been marketed by Omnigrid, Inc., under the trademark Omnigrid®. This embodiment uses a pattern of multicolor graduations, each graduation ideally being formed from a combination of a yellow line and a dark-shade green line. When the two lines are combined, the dark-shade green line will appear black because the yellow line is overlaid on the dark-shade green line during the manufacturing process.

The manufacturing process for this previous device involves several steps. By way of simplified explanation, the dark-shade green lines are applied to the back side of a sheet of transparent material, typically by the silk screening method. The yellow lines, which are wider than the dark-shade green lines, are then applied on top of selected dark-shade green lines. Because the yellow lines are wider, they appear on both sides of the dark-shade green lines, resulting in a two-color composite line. To insure uniformity in the appearance of the yellow lines on both sides of the dark-shade green lines, the wider yellow line must be precisely centered over the dark-shade green line. Imprecise centering of the yellow line will result in an irregular appearing composite line that can be confusing to the eye and interfere with precise alignment and measurement.

With the silk screen printing method, great care must be used in aligning the images on the screens and in applying the pigment in order to have precisely centered lines. Minor variations in technique will result in misalignment of the lines. For example, a small change in the speed of the squeegee or the pressure applied to the squeegee will cause variations in the appearance of the line. In addition, changes in the tautness of the screen and in the viscosity of the pigment will yield nonuniform lines. The alignment of the lines is also affected by environmental factors, such as temperature and humidity, which must be carefully controlled to keep the alignment within close tolerances.

In order to avoid these adverse factors during the manufacturing process, great care must be taken to stabilize the environment, maintain precise alignment of the equipment, and utilize trained and experienced personnel in the transferring of the images to the sheet of transparent material. However, even with these controls, unacceptable variations can occur, resulting from such things as an operator's fatigue or illness, as well as interruptions and distractions.

Consequently, there is a need for a process that requires less precision and results in an improved measuring device having uniformly appearing lines. Such a process should permit greater latitude in aligning images, enable the use of relatively unskilled labor, require less time in setting up equipment, and speed up the process of creating and printing or transferring the line images. In addition, such a process should be adaptable to other forms of manufacturing and printing, including, but not limited to, lithographic printing, lamination of a printed sheet to another sheet, laser etching, resist plating, use of UV-cured adhesive ink, and the use of high speed ink jet and laser printers, as well as printing on the front ("right reading") or back (reverse or "wrong reading") of a transparent sheet.

DETAILED DESCRIPTION

Figure 1:
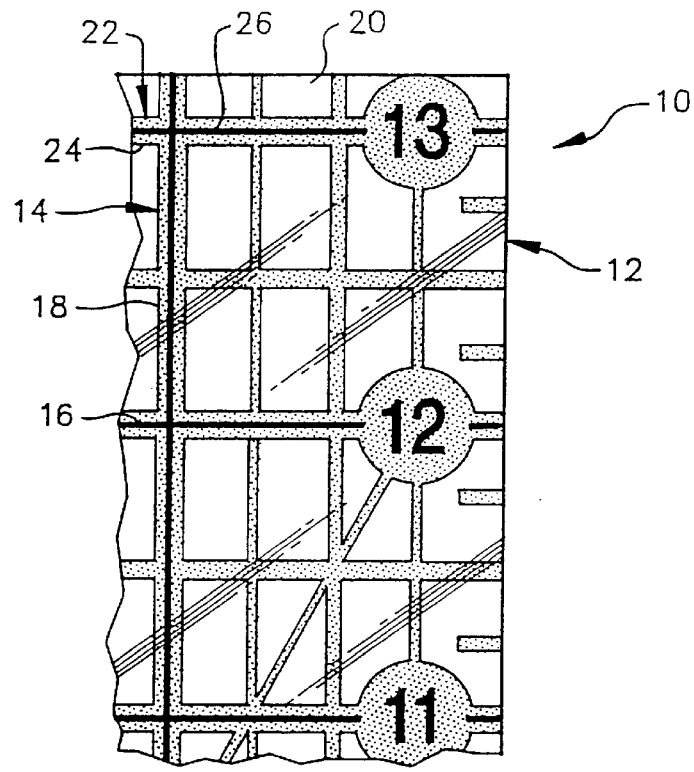
FIG. 1 is a partial front view of a prior transparent measuring device with multicolor lines.

Referring first to FIG. 1, illustrated therein is a portion of a transparent measuring device 10 formed from a transparent sheet 12 having composite multicolor lines 14 formed in accordance with previous methods. The lines 14 are formed from a first line 16 of a darker color or hue and a second line 18 of a contrasting lighter color or hue. Preferably, the second line 18 is of a greater width than the first line 16, so that as the first line 16 is applied over the second line 18, the second line 18 will be visible on both sides of the first line 16 when viewed from the front surface 20 of the sheet 12.

As previously described, this method of forming the multicolor lines 14 must be done with precision in order to avoid misalignment of the lines. For example, multicolor line 22 in FIG. 1 is misaligned, resulting in more of the lighter line being visible on the lower portion 24 than on the top portion 26 of the line 22.

Figure 2:
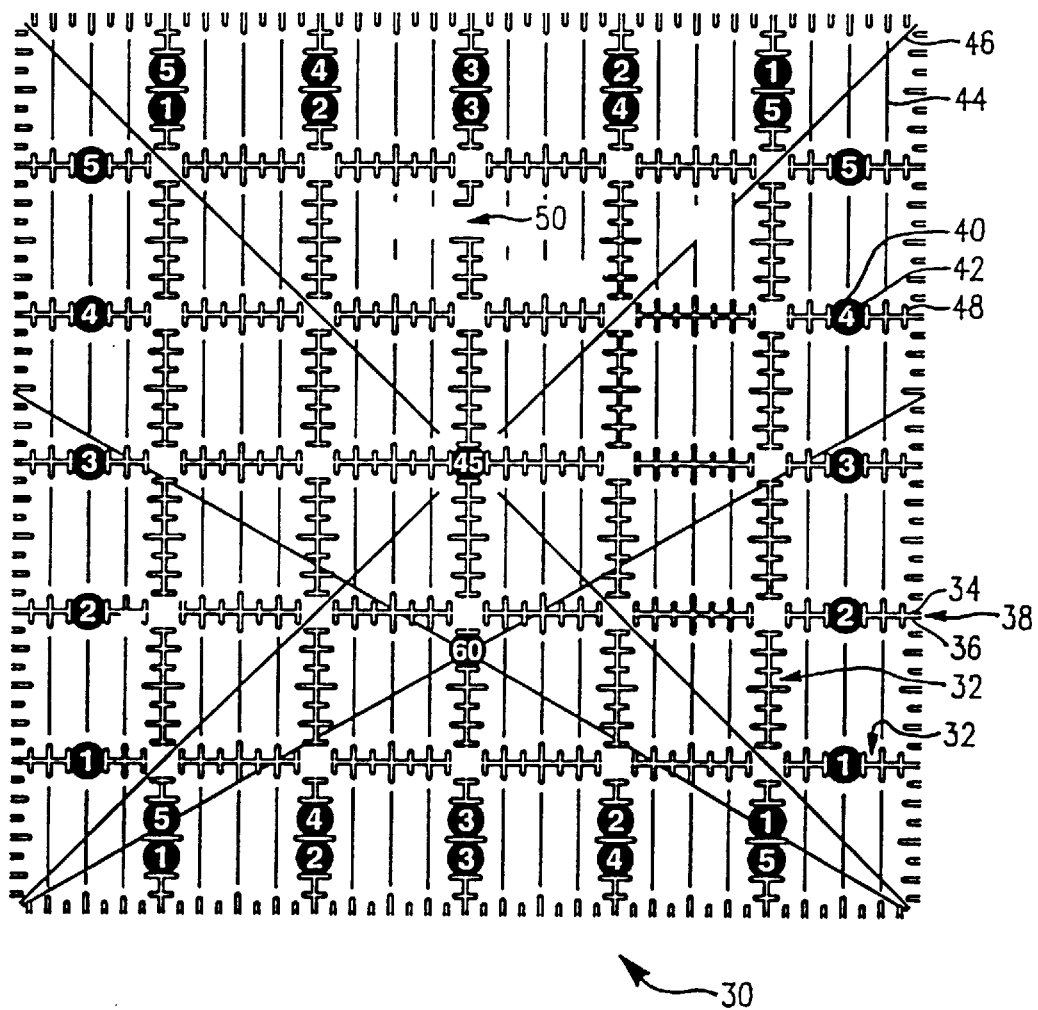
FIG. 2 is a top plan view of the first image to be applied to the sheet of transparent material in accordance with the present invention.

The measuring device and process of making of the present invention overcomes this imprecision. Referring next to FIG. 2, shown therein is a first image 30 consisting of a pattern of horizontal and vertical graduations 32 with short subdivisions 48 extending therefrom at substantially right angles. Each graduation 32 and subdivision 48 is formed from a pair of lines 34 and 36 that outline an uncolored gap 38.

Ideally, the lines 34 and 36 have a width in the range of 1 one-thousandth of an inch to 20 one-thousandths of an inch, although the width could be greater depending on the application. The preferable width for quilting applications is in the range of 15 one-thousandths to 20 one-thousandths. The uncolored gap 38 is centered between the pair of lines 34 and 36, and has a preferred width of 2 one-thousandths of an inch, although again this could be smaller or larger, depending on the application and the capabilities of the image creation equipment. This provides the manufacturer and operator with greater tolerances within which to transfer the images and yet maintain precise alignment.

Ideally, the uncolored gaps 38 are bounded on substantially all sides by the pair of lines 34 and 36, and they are disposed centrally therein. The longitudinal ends 39 and 41 of the gaps 38 are not bounded, and there may be applications where there are segments that are unbounded along the length of the composite lines. There may also be applications where it is preferred that the gaps 38 not be centered between the pair of lines 34 and 36. Hence, variations are contemplated in the present invention.

The first image 30 includes large darkened circles 40 have uncolored number spaces 42 formed therein. In addition, the first image 30 includes solid vertical lines 44, and angled lines 46 that are of the same color as the graduations 32, although they do not form a part of the multicolor graduations 32. The large blank area 50 is used for the Omnigrid trademark, which is discussed more fully below.

Figure 3:
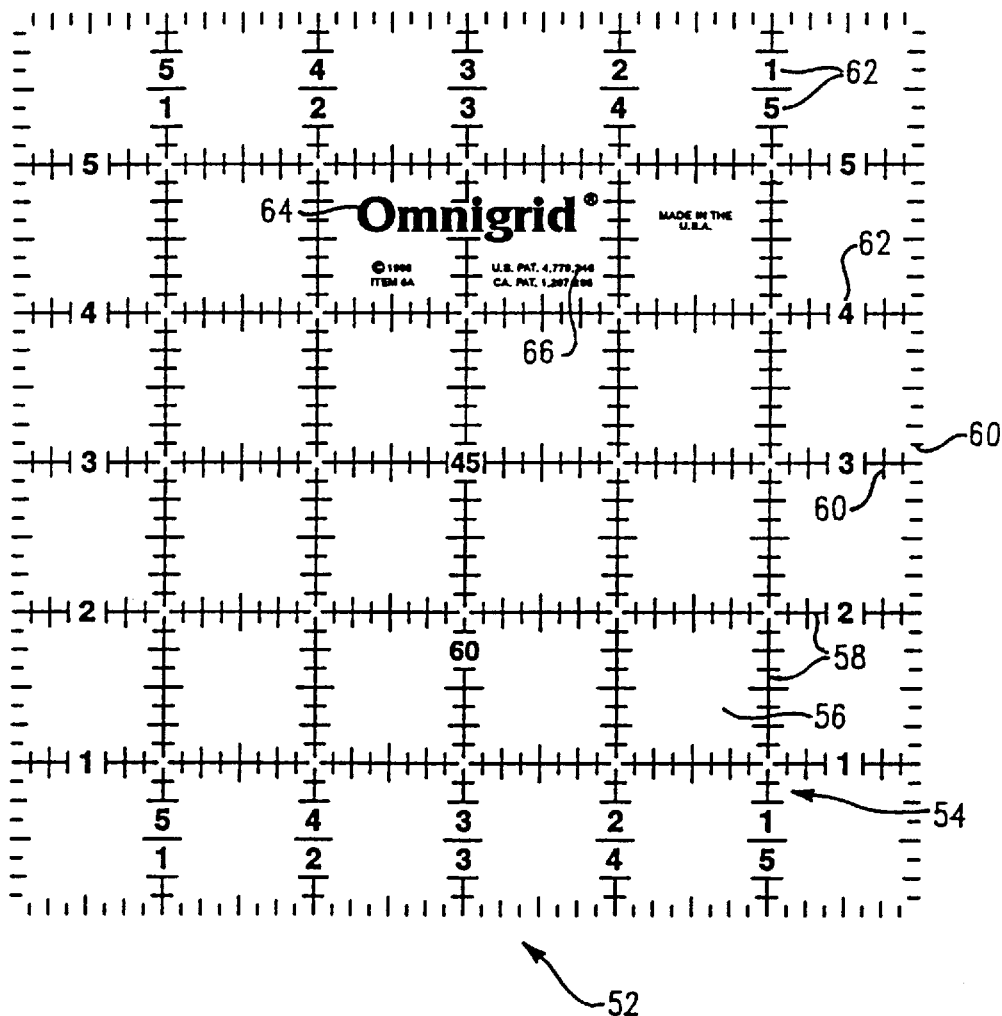
FIG. 3 is a top plan view of the second image to be applied to the sheet of transparent material in accordance with the present invention.

Referring next to FIG. 3, shown therein is a second image 52 comprising solid horizontal lines 57 and vertical lines 58 forming a grid pattern 54 of squares 56. This second image 52, as well as the first image 30, is shown in the form it would appear on camera-ready film. Each of these lines 57 and 58 has subdivision lines 60 that further divide the lines 58 into smaller units of measurement. In addition, each of the lines 57 and 58 has corresponding numbers 62 along the outside rows and columns of squares 56. In the embodiment depicted herein, these numbers 62 correspond to inches, although other units of measurement may be used, such as metric units. The Omnigrid trademark 64 and other legends and indicia 66 appear inside the squares 56.

Ideally, the lines 57 and 58 have a width that is 2 one-thousandths of an inch wider than the width of the uncolored gap 38 formed by the graduations 32. In other words, if the uncolored gap 38 is 12 one-thousandths of an inch wide, the lines 57 and 58 would be 14 one-thousandths of an inch wide. In addition, the numbers 62 are preferably 2 one-thousandths of an inch larger than the corresponding uncolored numbers spaces 42 formed in the circles 40 on the first image 30. The intersection of the horizontal and vertical lines 57 and 58 is left blank to provide an unobstructed viewing space that enables a user to precisely align the measuring device.

Figure 9:
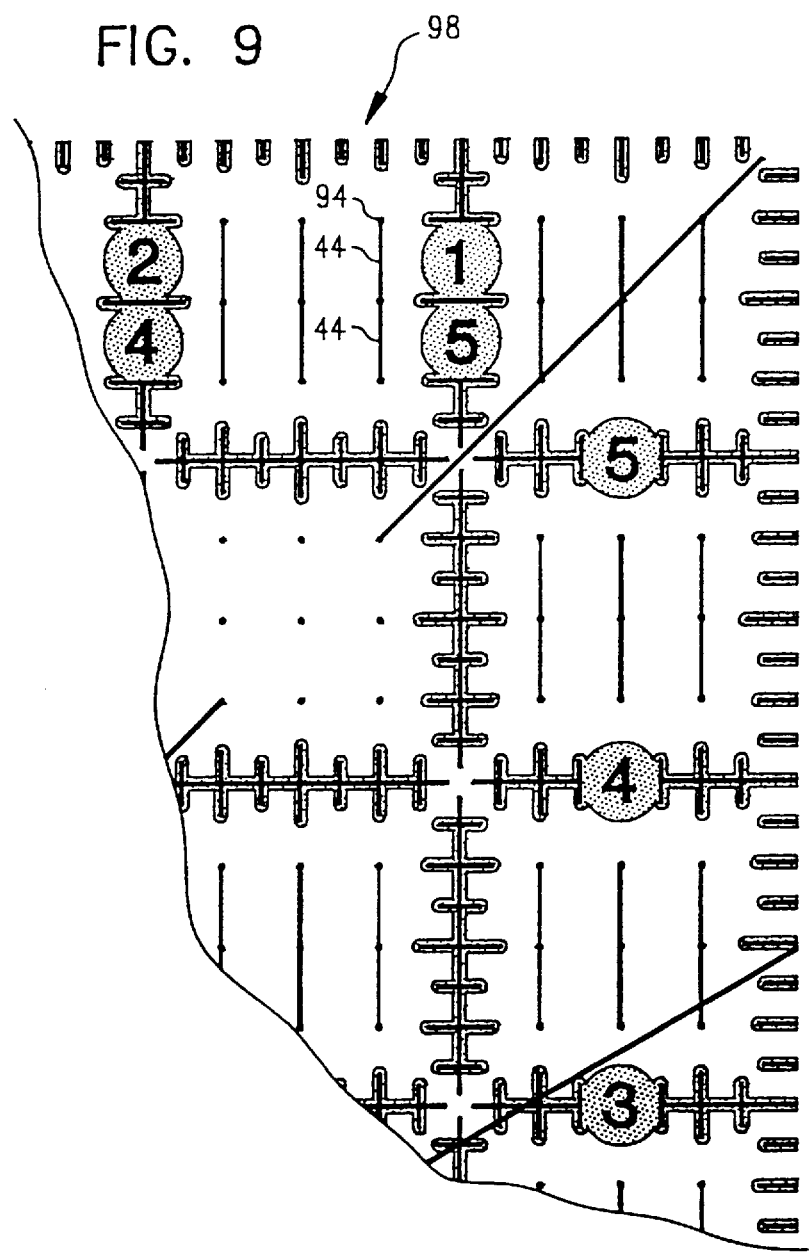

When the first and second images 30 and 52 are combined, they form a composite image, as will be described more fully below in conjunction with FIG. 9. Briefly, the first image 30 is applied to the back surface of a transparent sheet, and the second image 52 is aligned and applied on top of the first image 30. When the images 30 and 52 are so combined, the contrasting colored second image 52 fills in the gaps 38 and number spaces 42 on the first image 30, creating a composite set of lines.

The process for making the transparent measuring device of the present invention can be done by a variety of methods. Although the use of ink to create the images is described herein, other materials or processes may be used, including pigment, toner, photographic deposit, and photosensitive emulsion.

The preferred method is the screen printing process because it permits the application of a heavy deposit of ink. By way of general description, in the process of the present invention, the images described above are first created and then transferred to a screen. The screen is a commercially-available material that has a thread count in the range of 150 to 400 threads per inch.

Ideally, the images 30 and 52 are created as electronic images on a computer using a commercially-available graphics program that is capable of large magnification and line generation down to and even below 1 one-thousandth of an inch. Each electronic image is then generated on to camera-ready film, such as is shown in FIGS. 2 and 3, after which it is transferred to a screen through a photo emulsion process, which is well-known in the industry.

Alternatively, present methods do permit the direct transfer of an electronic or computer image to a print screen, bypassing the step of using an ortho film, although this is much more expensive. In addition, a lithograph press, an engraving process, thermal (hot) stamping of foil, or a photographic process may also be used, as well as any combination of graphics and manufacturing. Finally, high-speed laser printers that print the computerized image directly to a plastic sheet are also available. Virtually any pigment transfer method may be used to generate the images of the present invention on the transparent sheet. Another method takes advantage of precision cutting equipment to cut out pre-printed adhesive plastic that can be applied as a layered substrate to the transparent sheet.

Continuing with the method of the present invention, once the screen is formed for the first image 30, it is mounted in accordance with conventional screen printing methods. A sheet of transparent material, preferably acrylic, such as the sheet 12 described above, is placed below the screen in a jig that holds the plastic sheet in place, as will be described in more detail below. The ink is then applied with a squeegee as is well-known in the art. It is important that the sheet of plastic be cleaned prior to the application of ink. A quick method is to use a roller on the sheet, which picks up dirt and other material off the sheet.

In the method of the present invention, the image 30 of FIG. 1 is first applied to the back side of the sheet 12. It is preferable that the first image be of a lighter color or hue, such as yellow. However, a darker or contrasting color or hue can be used for the first image, such as black or dark-shade green. When so applied to the sheet 12, the graduations 32 outline the uncolored gap 38 with uncolored subdivisions 48. In addition, the circles 40 have uncolored numbers 42 formed therein. The image 32 is then inspected and, if acceptable, set aside to dry.

After the ink from the first image has dried, the screen having the second image 52 thereon is mounted and aligned with the first image 30. Alignment is much quicker and easier, because the lines 58 and numbers 62 will cover the corresponding uncolored areas with a slight overlap. This overlap allows a small error in the alignment without resulting in misalignment of the lines 58 and numbers 62 in the corresponding uncolored gaps 38 and number spaces 42 created by the first image. The second image is then printed on the sheet using a contrasting darker color or hue. When viewed from the front surface 20 of the sheet 12, the darker lines 58 and numbers 62 will register perfectly within the gap 58 and number spaces 42 in the wider lighter line, even though the second image 52 may be slightly misaligned.

This application of the second image 52 is not an overlay of ink over the first image. Rather, it is the application of ink in the blank, uninked areas or gaps 38 left by the first image 30, and only a slight overlap exists. As such, this method not only results in precise registration of the smaller darker line within the larger lighter line, it also reduces bleeding of one color into the other as can occur with an overlay. If the color of the first image 30 is totally opaque, then the second image 52 can have a width of two one-thousandths less than the width of the first image 30.

It has been noted that confusion as to which side of the sheet is the top side may result from having the contrasting colors visible from both sides of the sheet of transparent material. One method for overcoming this confusion is to apply an overlay of one color on the first two images, thus making only the overlay visible from the back side of the transparent sheet.

Figure 4:
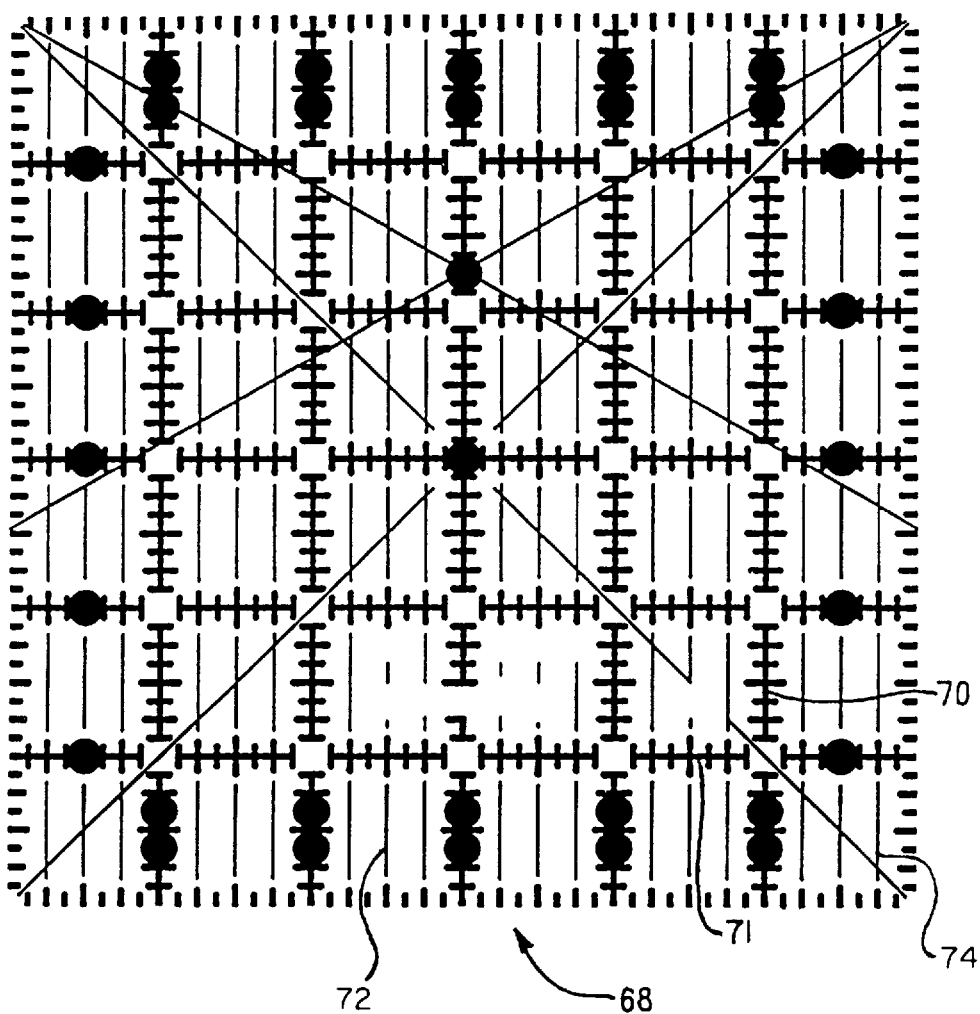
FIG. 4 is a top plan view of a third image to be applied to the sheet of transparent material in accordance with another embodiment of the present invention.

In this regard, FIG. 4 illustrates a third image 68 that consists of a grid pattern of thick, solid vertical lines 70 and horizontal lines 71 that are wider than the solid lines 57 and 58 of the second image 52 and slightly smaller than the graduations 32 and other lines 44 and 48, and circles 40 in the first image 32. Additional vertical lines 72 and angled lines 74 are used, which are also of a smaller width than the corresponding vertical lines 44 and angled lines 46 shown in FIG. 2.

Ideally, the lines 70 are 1 to 2 one-thousandths of an inch smaller than the corresponding lines in the first image 30. This third image 68 can be applied over the second image 52 as an overlay. This overlay encapsulates the first two images 30 and 52, improving the appearance and protecting the images, thus increasing the useful life of the measuring device 10. It also aids users in determining which side of the measuring device 10 is the front side because the overlay only permits the viewing of the composite multicolor lines from the front side 20. The third image 68 ideally is of a color or hue that matches the first image 30, in this case a lighter color, such as yellow.

As a result of adding the overlay, another step is added to the process. Because the third image 68 is slightly smaller, minor misalignment will not be detected. Even though a third step is added in this embodiment, the overall efficiency and speed is still improved over the prior method. In addition, fewer rejections will result and a high-quality product will be produced virtually each run. However, the third image may not be necessary, such as in the lithographic process, where the second image (black in this case) is of a width to cover the entire or almost the entire first image (yellow in this case).

Figure 5:
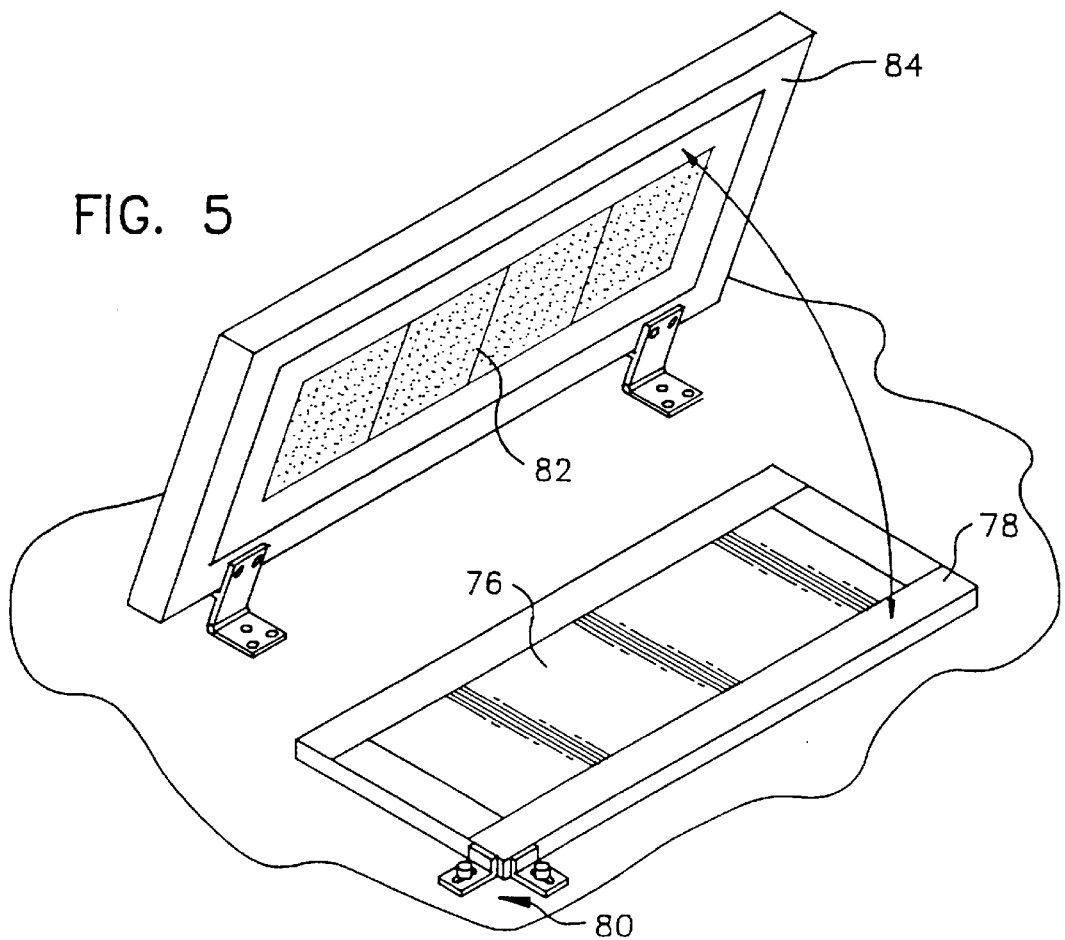
FIG. 5 is an isometric view of a screen printing apparatus for printing images in accordance with the process of the present invention.

FIG. 5 illustrates a screen printing apparatus for carrying out the method of the present invention. In particular, shown therein is a plastic sheet 76 placed in a jig 78 that holds the sheet 76 in place. The screen 82 is mounted in correlators or registration clamps 84. The jig clamps 80 may be adjusted to position the plastic sheet 76 precisely in position under the screen 82. The correlators 84 also include similar adjustment mechanisms (not shown) for making minor adjustments in the position of the screen 82.

The screen 82 is rotated into position over the plastic sheet 76 where ink is applied and a squeegee pushes the screen 82 down on the plastic sheet 76, as is well known in the art. The sheet 76 with the image printed thereon is then removed.

As will be appreciated from the foregoing, the present invention results in a higher production rate using less-skilled labor that achieves the same or better quality product. It is also to be appreciated that changes made be made without departing from the spirit and scope of the invention. For instance, the steps described above may be reversed, with the third image 68 applied to the sheet first, then the second image 52, and finally the first image 30. Alternatively, the third image can be eliminated and the first two images used. If the reverse steps are done, the images must be applied to the front side of the sheet so the second and first images will be visible. The drawback to this method is the possibility of parallax errors in viewing the lines on the top of a thick sheet of transparent material.

While a thick piece of material is preferred in order to act as a cutting guide for rotary cutters, scissors, razors, and other cutting tools, as well as a measuring and marking device, the present invention can be applied to sheets of thinner material that are then laminated together. For example, rolled sheets of 5 mil plastic can be printed by one of several methods described above, then cut and adhesively applied to thin or thick transparent plastic sheets. Ultrasonic adhesion of Mylar or similar substrates may also be done, and a single color may be applied to any combination of the two substrates and then aligned prior to bonding of the substrates.

Figure 6:
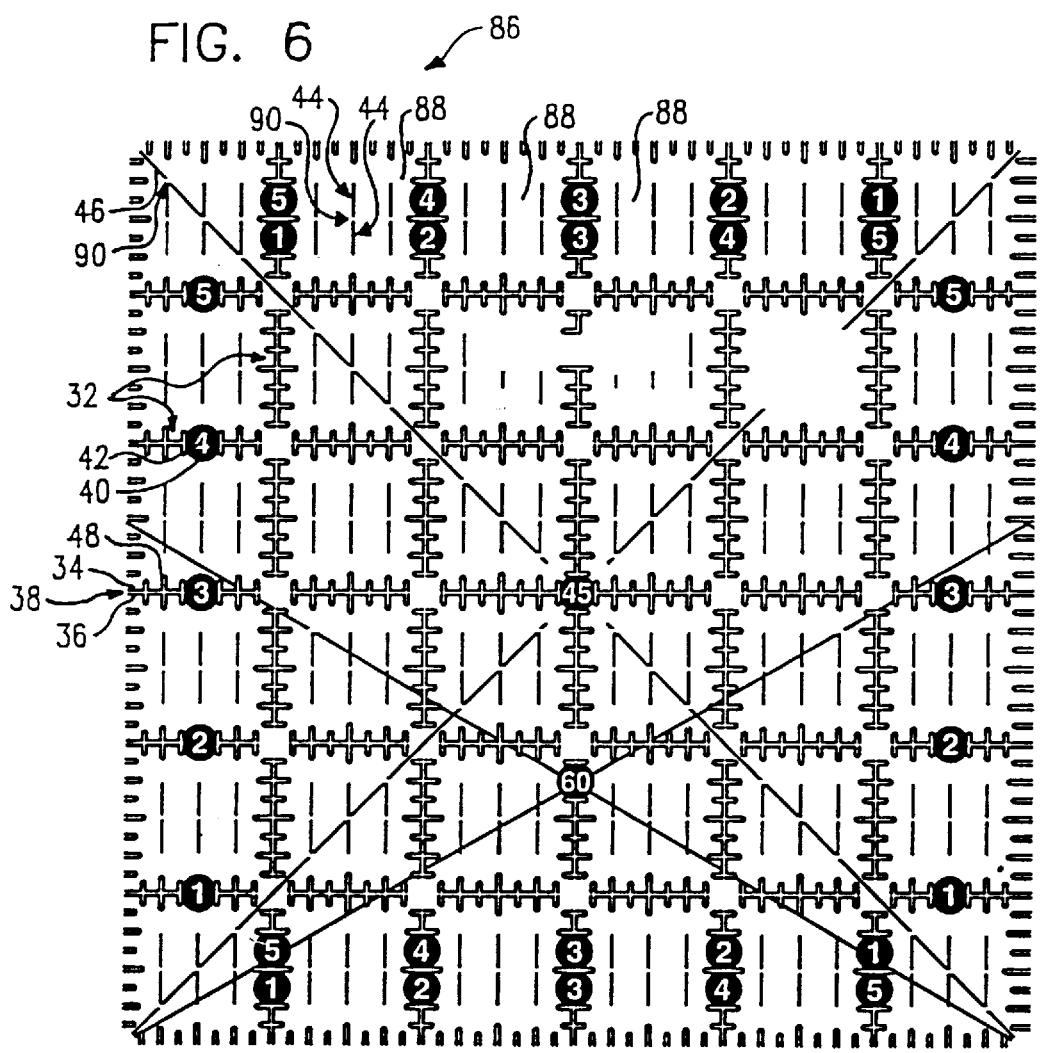
FIG. 6 is a top plan view of a first image to be applied to a sheet of transparent material in accordance with an alternative embodiment of the present invention.

FIGS. 6–9 illustrate another embodiment and further improvement in accordance with the present invention. For ease of illustration, the same reference numbers will be used for the common subject matter illustrated in FIGS. 2–4 and 6–9. Shown in FIG. 6 is a first image 86 wherein the solid vertical lines 44 in each square 88 are broken at their vertical midpoint to leave an open gap 90. Each angled line 46 is also broken at their junction with a vertical line 44 to leave the gap 90 open. In all other respects the first image 86 is identical to the first image 30 illustrated in FIG. 2. It is to be understood that the vertical lines may have more than one gap 90 formed therein. The gaps 90 may appear at regular or irregular intervals depending on the application, the scale, and the overall design.

Figure 7:
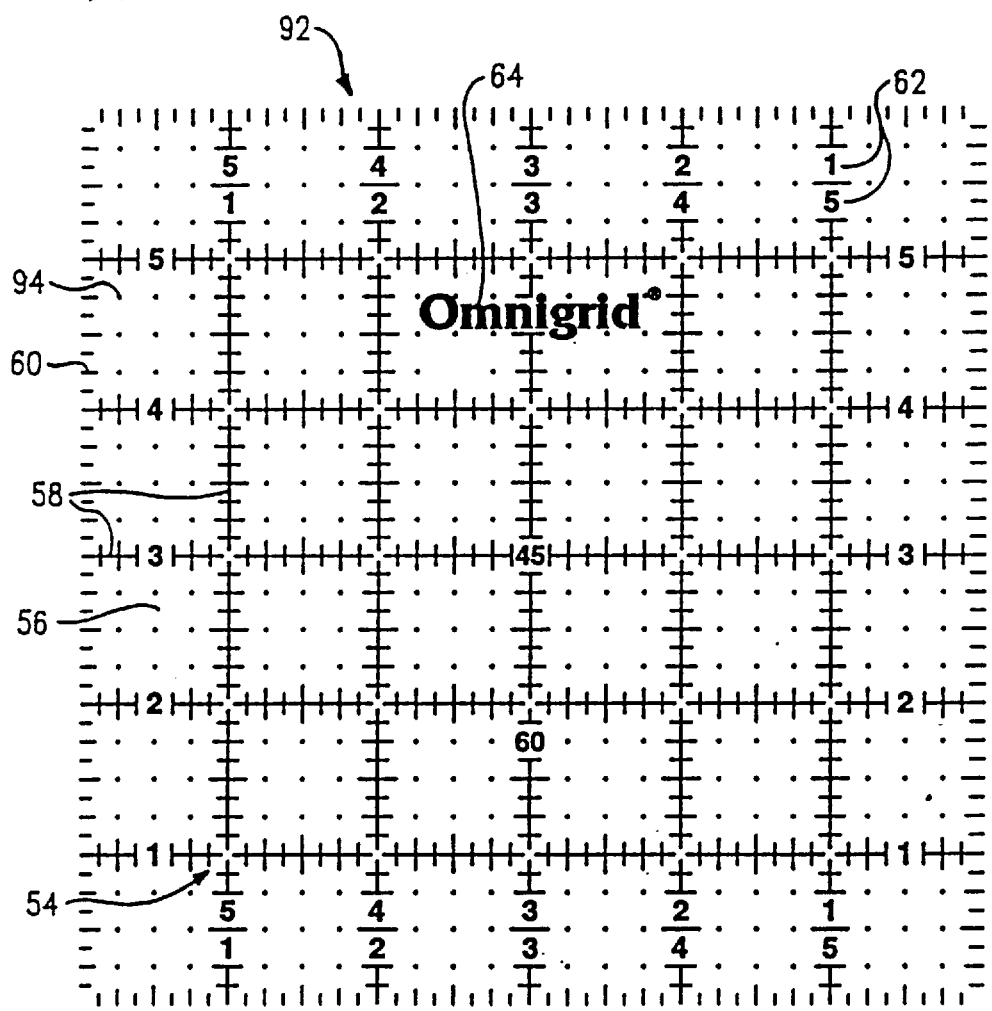
FIG. 7 is a top plan view of a second image to be applied to the sheet of transparent material in accordance with the alternative embodiment of FIG. 6.

FIG. 7 illustrates a second image 92 having squares 56 that include a plurality of dots 94. The dots 94 are positioned in each square 56 such that when the second image 92 is applied over the first image 86, the dots 94 will be located in the gaps 90 created in the vertical lines 44. Ideally, the dots 94 are of a larger size than the gaps 90 and of a contrasting color from the solid vertical lines 44 so they will be more readily visible to the user. These dots 94 will aid in aligning and measuring subdivisions on the transparent measuring device. It is to be understood that the dots 94 may be the same size or smaller than the gaps 90 if desired.

Figure 8:
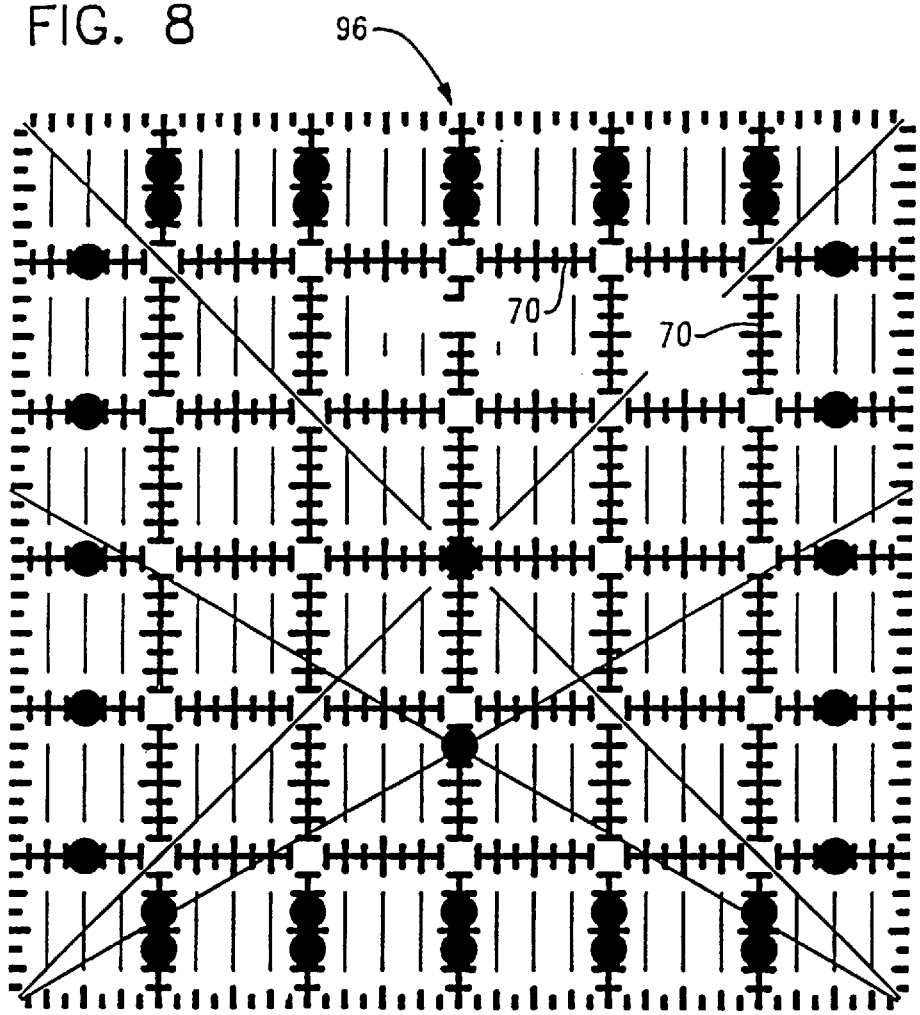
FIG. 8 is a top plan view of an optional third image to be applied to a sheet of transparent material in accordance with the alternative embodiment of FIGS. 6 and 7; and, FIG. 9 is a top plan view of the composite image formed in accordance with the alternative embodiment of FIGS. 6–8.

An optional third image 96 is shown in FIG. 8, which corresponds to the third image 68 illustrated in FIG. 4. The final composite image 98 consisting of the combination of the first image 86, the second image 92, and the third image 96, is shown in FIG. 9, where the dots 94 are visible between the broken solid vertical lines 44 and the angled lines 46. The process described above can be reversed if the composite image is to be applied to the opposite side of the transparent sheet.

While a preferred embodiment of the invention has been described, it is to be understood that variations may be made without departing from the spirit and scope of the invention. Thus, the scope of the invention is to be limited only by the claims that follow.

The embodiments of the invention in which an exclusive property or privilege is claimed are defined as follows:

1. A transparent measuring device, comprising:
   a sheet of transparent material having opposing surfaces;
   one or more multicolor markings applied to one of said opposing surfaces on said sheet, each of said multicolor markings comprising a first image and a second image, said first image and said second image having contrasting colors, said first image having a colored area with one or more uncolored areas formed inside said colored area and said second image having one or more contrasting colored areas that at least completely fill one or more of said uncolored areas.

2. The device of claim 1, wherein said opposing surfaces of said sheet of transparent material further comprise a front surface and a back surface, and further wherein said first and second images are applied to said back surface.

3. The device of claim 1, further comprising a transparent laminate having a first side with said one or more multicolor markings formed thereon and an opposing second side attached to said transparent sheet of material.

4. The device of claim 3, wherein said second image is applied to said first side of said transparent laminate and said first image is applied on said second image.

5. The device of claim 1, wherein said opposing surfaces of said sheet of transparent material comprise a front surface and a back surface, and further wherein said first image is applied to said back surface and said second image is applied on said first image.

6. The device of claim 1, wherein said opposing surfaces of said sheet of transparent material comprise a front surface and a back surface, and further wherein said second image is applied to said front surface and said first image is applied on said second image.

7. A transparent measuring device for use in measuring, marking, and cutting material, comprising:
   a sheet of transparent material having opposing surfaces;
   one or more composite lines formed on said sheet of transparent material, each of said composite lines comprising a first image and a second image, said first image and said second image having contrasting colors, said first image formed to have a colored area with one or more uncolored areas formed inside said colored area and said second image having one or more colored areas that at least completely fill one or more of said uncolored areas.

8. The device of claim 7, wherein said sheet of transparent material comprises a front surface and a back surface, and further wherein said one or more composite lines are formed on said back surface.

9. The device of claim 7, wherein said opposing surfaces of said sheet of transparent material comprise a front surface and a back surface, and further wherein said first image is applied to said back surface and said second image is applied to said first image.

10. The device of claim 9, wherein said composite line further comprises a third image of the same color as said first image and sized and shaped to be no larger than said first image, and further wherein said third image is applied on said first and second images.

11. The device of claim 7, wherein said opposing surfaces of said sheet of transparent material comprise a front surface and a back surface, and further wherein said one or more composite lines are applied to said front surface.

12. The device of claim 11, wherein said second image is applied to said front surface and said first image is applied on said second image such that said second image at least completely fills one or more of said uncolored areas in said first image.

13. The device of claim 7, further comprising a thin transparent sheet affixed to said sheet of transparent material, said thin transparent sheet having said one or more composite lines formed thereon.

14. The device of claim 13, wherein said opposing sides of said sheet of transparent material comprise a front surface and a back surface, and further wherein said thin transparent sheet is affixed to said front surface of said sheet of transparent material.

15. The device of claim 13, wherein said opposing sides of said sheet of transparent material comprise a front surface and a back surface, and further wherein said thin transparent sheet is affixed to said back surface of said sheet of transparent material.

16. A method of making a transparent measuring device, comprising the steps of:
   creating a first image having one or more colored areas with one or more uncolored areas disposed therein;
   creating a second image having one or more colored areas sized and shaped to at least completely fill one or more of the uncolored areas in the first image;
   transferring the first image to a sheet of transparent material; and
   transferring the second image to the sheet of transparent material to form a composite image of contrasting colors wherein the one or more colored areas of the second image at least completely fill one or more of the uncolored areas of the first image with a contrasting color.

17. The method of claim 16, wherein said steps of creating the first and second images further comprises creating a third image sized and shaped to be no larger than the first image, and the step of transferring the images further comprises transferring the third image to the sheet of transparent material so that the third image is applied over the first and second images and is of the same color as the first image.

18. The method of claim 16, wherein said steps of creating the first and second images further comprises creating the first and second images electronically and storing the electronically-created images in an electronic storage device, and further wherein said step of transferring the first and second images further comprises transferring the electronically-stored images to the sheet of transparent material.

19. The method of claim 16, wherein the steps of transferring the first and second images comprises the steps of applying the first image to a first screen and applying the second image to a second screen, and then using the screen printing process to apply the images on the first and second screens to the sheet of transparent material.

20. The method of claim 17, wherein the steps of transferring the first and second images comprises the steps of applying the first image to a first screen, applying the second image to a second screen, applying the third image to a third screen, and using the screen printing process to apply the image on the first screen to the back surface of the sheet of transparent material, then to apply the image on the second screen onto the first image on the back surface of the sheet of transparent material, and then to apply the third image onto the second and first images on the back surface of the sheet of transparent material.

21. The method of claim 16, wherein the steps of transferring the first and second images comprises the steps of applying the first image to a first screen and applying the second image to a second screen, and then using the screen printing process to apply the second image on the second screen to the front surface of the sheet of transparent material and then to apply the first image on the first screen to the second image on the front surface of the sheet of transparent material.

22. A process for forming lines on a sheet of transparent material, the process comprising the steps of:

generating a first pattern of lines with one or more lines of the first pattern of lines having an uncolored area approximately centrally disposed along the length thereof;

generating a second pattern of solid lines having a size that substantially matches the pattern of the uncolored areas of the first pattern of lines; and combining the first and second patterns of lines on the sheet of transparent material wherein the one or more of the solid lines in the second pattern of lines at least fills one or more of the uncolored areas in the first pattern of lines with a color that contrasts with the color of the first pattern of lines.

23. The process of claim 22, wherein said step of combining the first and second patterns of lines comprises the steps of:

transferring the first pattern of lines to a first screen and the second pattern of lines to a second screen; and screen printing the first and second patterns of lines to the sheet of transparent material.

24. The process of claim 23, wherein said step of screen printing comprises the steps of:

screen printing the first pattern of lines to the sheet of transparent material with the uncolored areas remaining uncolored; and screen printing the second pattern of solid lines onto the first pattern of lines to at least fill the uncolored areas in the first pattern of lines with a color that contrasts with the color of the first pattern of lines to thereby form one or more composite lines.

25. The process of claim 23, wherein said step of screen printing comprises the steps of:

screen printing the second pattern of lines onto the sheet of transparent material; and screen printing the first pattern of lines onto the second pattern of lines on the sheet of transparent material with the uncolored areas in the first pattern of lines at least filled by the second pattern of lines with a color that contrasts with the color of the first pattern of lines to thereby form one or more composite lines.

26. The process of claim 23, wherein the steps of generating the first and second patterns of lines comprises electronically generating a first image of the first pattern of lines and electronically generating a second image of the second pattern of lines.

27. The process of claim 26, wherein the step of transferring the first and second patterns of lines comprises the steps of:

transferring the first image to a first camera-ready film sheet and transferring the second image to a second camera-ready film sheet; and transferring the first image from the first camera-ready film sheet to the first screen and transferring the second image from the second camera-ready film sheet to the second screen with a photo emulsion process.

28. The process of claim 26, wherein the step of transferring the first and second patterns of lines comprises the step of directly transferring the first electronic image to the first screen and directly transferring the second electronic image to the second screen.

29. The process of claim 22, comprising the further steps of:

generating a third pattern of solid lines that substantially matches the first pattern of lines; and combining the third pattern of solid lines with the combined first and second patterns of lines on the sheet of transparent material such that the third pattern of solid lines substantially covers the combined first and second patterns of lines.

30. A transparent measuring device for measuring, marking, and cutting material, comprising:

a sheet of transparent material having a front surface and a back surface;

a pattern of composite lines formed on the back surface of the sheet of transparent material, said pattern of composite lines comprising a first pattern of lines and a second pattern of lines, said first pattern of lines having a plurality of first colored lines with uncolored areas, each of said uncolored areas being centrally disposed in said first colored lines and bounded at least along the length of said first colored lines; and said second pattern of lines having a plurality of solid second colored lines that at least fill said uncolored areas in said plurality of first colored lines with a color that contrasts with the color of said first colored lines.

31. The transparent measuring device of claim 30, wherein said first pattern of lines is applied directly to said back surface of said sheet of transparent material, and said second pattern of solid lines is applied to said first pattern of lines and slightly overlaps onto the first pattern of lines.

32. The transparent measuring device of claim 30, wherein said pattern of composite lines further comprises a third pattern of solid lines applied to said second pattern of lines and said first pattern of lines to substantially cover said second pattern of solid lines and said first pattern of lines with a color that is substantially the same as the color of said first colored lines.

* * * * *